United States Patent
Locker et al.

(10) Patent No.: US 9,122,735 B2
(45) Date of Patent: Sep. 1, 2015

(54) METHOD AND APPARATUS FOR MODIFYING A TRANSITION TO AN ALTERED POWER STATE OF AN ELECTRONIC DEVICE BASED ON ACCELEROMETER OUTPUT

(75) Inventors: Howard Locker, Cary, NC (US); Mark Charles Davis, Durham, NC (US); Michael Thano Matthews, Cary, NC (US); Steven Richard Perrin, Raleigh, NC (US); Sean Michael Ulrich, Raligh, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 85 days.

(21) Appl. No.: 12/771,908

(22) Filed: Apr. 30, 2010

(65) Prior Publication Data

US 2011/0267026 A1    Nov. 3, 2011

(51) Int. Cl.
*H04M 1/00* (2006.01)
*G06F 11/30* (2006.01)
*G06F 1/32* (2006.01)

(52) U.S. Cl.
CPC .......... *G06F 11/3058* (2013.01); *G06F 1/3203* (2013.01); *G06F 1/3231* (2013.01); *G06F 11/3013* (2013.01); *Y02B 60/1289* (2013.01)

(58) Field of Classification Search
USPC ............. 455/67.11, 574, 127.5, 343.1–343.6, 455/566, 418, 456, 575, 557
See application file for complete search history.

(56) References Cited

U.S. PATENT DOCUMENTS

| | | | |
|---|---|---|---|
| 2007/0075965 A1* | 4/2007 | Huppi et al. | 345/156 |
| 2008/0088602 A1* | 4/2008 | Hotelling | 345/173 |
| 2008/0305746 A1* | 12/2008 | Griffin et al. | 455/67.11 |
| 2009/0137286 A1 | 5/2009 | Luke et al. | |
| 2009/0163226 A1 | 6/2009 | Karkaria et al. | |
| 2009/0239591 A1* | 9/2009 | Alameh et al. | 455/574 |
| 2009/0265671 A1* | 10/2009 | Sachs et al. | 715/863 |
| 2010/0048256 A1* | 2/2010 | Huppi et al. | 455/574 |
| 2010/0167792 A1* | 7/2010 | Chen et al. | 455/566 |
| 2010/0304757 A1* | 12/2010 | Yoshioka | 455/456.1 |
| 2010/0317332 A1* | 12/2010 | Bathiche et al. | 455/418 |

FOREIGN PATENT DOCUMENTS

| | | |
|---|---|---|
| CN | 101527753 | 9/2009 |
| CN | 101578571 | 11/2009 |

* cited by examiner

*Primary Examiner* — Junpeng Chen
(74) *Attorney, Agent, or Firm* — Kunzler Law Group (57) ABSTRACT

A method and apparatus are disclosed for modifying a transition to an altered power state of an electronic device based on accelerometer output. The apparatus includes an electronic device having a display and an accelerometer. The apparatus also includes a determination module, and a modification module. The determination module determines an in-use condition of the electronic device based on accelerometer output for the electronic device. The modification module modifies a transition to an altered power state of the electronic device in response to the determination module determining the in-use condition.

15 Claims, 7 Drawing Sheets

METHOD AND APPARATUS FOR MODIFYING A TRANSITION TO AN ALTERED POWER STATE OF AN ELECTRONIC DEVICE BASED ON ACCELEROMETER OUTPUT

BACKGROUND

1. Field

The subject matter disclosed herein relates to transitioning to an altered power state of electronic devices and more particularly relates to modifying a transition to an altered power state of an electronic device based on accelerometer output.

2. Description of the Related Art

The capabilities of portable electronic devices continue to increase. A user may typically read books, documents, or articles and view videos on a portable electronic device such as an eBook reader, a mobile phone, a tablet computer, and the like. While a user reads a page or views a video clip, the portable electronic device may not receive user input for an extended period of time. Often, the automatic timer to dim, turn off the display, or to enter a standby state elapses while the user is using the portable electronic device, producing an undesired result that interrupts the user's experience.

SUMMARY

From the foregoing discussion, inventors herein have identified a need for a method and apparatus that modifies a transition to an altered power state of an electronic device. Beneficially, such a method and apparatus would modify the transition to the altered power state based on accelerometer output.

The embodiments of the present disclosure have been developed in response to the present state of the art, and in particular, in response to the problems and needs in the art that have not yet been fully solved by currently available electronic devices. Accordingly, the embodiments have been developed to provide a method and apparatus for modifying a transition to an altered power state of an electronic device that overcome many or all of the above-discussed shortcomings in the art.

The apparatus for modifying a transition to an altered power state of an electronic device based on accelerometer output includes an electronic device having a display and an accelerometer. The apparatus also includes a determination module and a modification module. The determination module determines an in-use condition of the electronic device based on accelerometer output for the electronic device. The modification module modifies a transition to an altered power state of the electronic device in response to the determination module determining the in-use condition.

In a further embodiment, the determination module monitors changes in one or more accelerometer values of the accelerometer output over a period of time. The determination module determines the in-use condition based on the changes in the one or more accelerometer values over the period of time. In a further embodiment, the determination module determines the in-use condition in response to determining that the changes in the one or more accelerometer values correspond with an in-use definition that is indicative of a user using the electronic device.

In one embodiment, the determination module further includes a filtering module filtering particular changes in the one or more accelerometer values out of the accelerometer output. The particular changes may be characteristic of a type of movement of the electronic device and the determination module may determine the in-use condition from the filtered accelerometer output.

In one embodiment, the apparatus further includes a learning module monitoring user interaction with the electronic device. The learning module may also associate the monitored user interaction with a portion of the accelerometer output and adapt an in-use definition based on the association of the monitored user interaction with the portion of the accelerometer output.

In one embodiment, the modification module extends time of one or more timers associated with the transition to the altered power state of the electronic device in response to the determination module determining the in-use condition. In certain embodiments, the altered power state of the electronic device includes one or more of a quiesced state, a low-power state, a high-power state, a state in which one or more operations of the electronic device are operating at a high capacity, and a state in which one or more operations of the electronic device are one or more of suspended and operating at a reduced capacity. In one embodiment, the electronic device includes one of a portable information handling device, mobile phone, and a peripheral device.

A method is presented for modifying a transition to an altered power state of an electronic device based on accelerometer output. In one embodiment, the method includes the steps to carry out the functions of the apparatus.

A computer program product is also presented for modifying a transition to an altered power state of an electronic device based on accelerometer output, also with similar steps to carry out the functions of the apparatus.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

In order that the advantages of the embodiments will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising a computer readable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1:
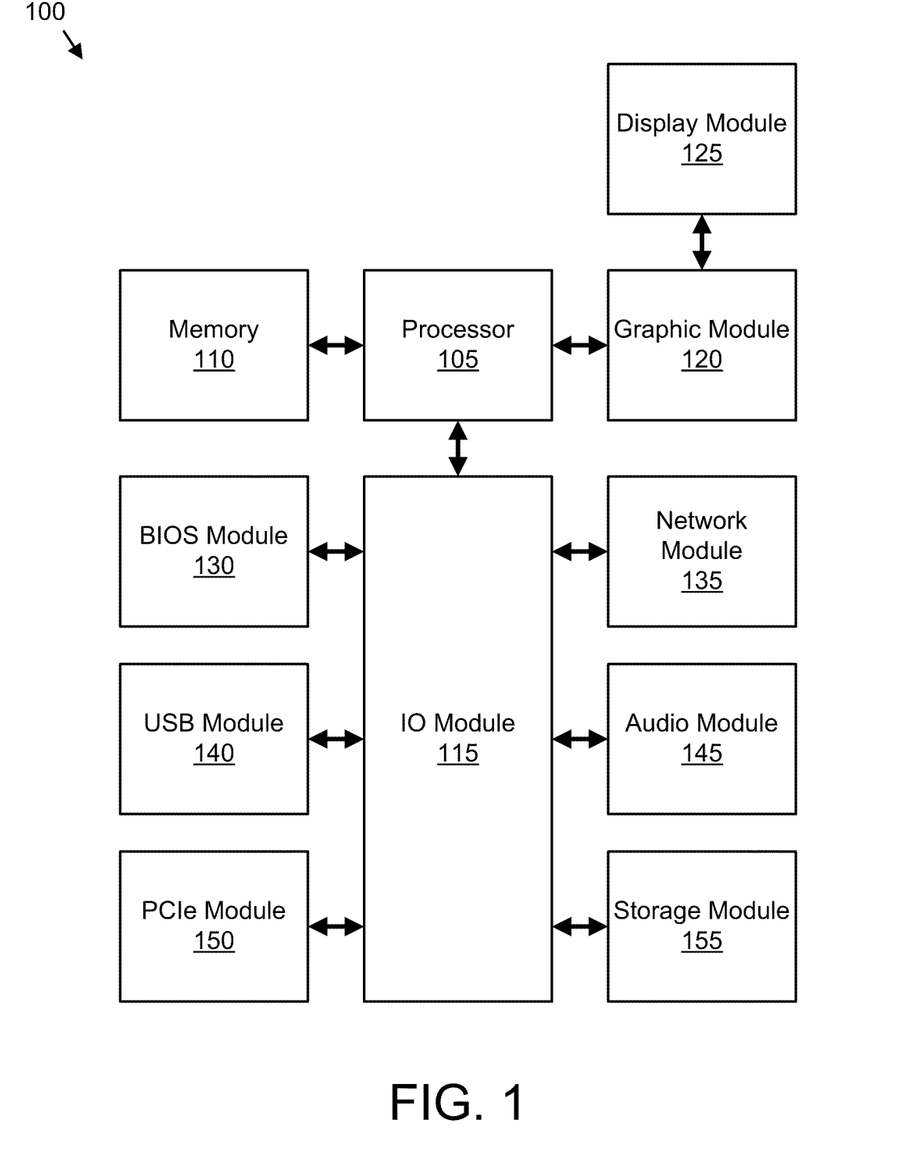
FIG. 1 is a schematic block diagram illustrating one embodiment of a computing device.

FIG. 1 is a schematic block diagram illustrating one embodiment of a computing device 100. The computing device 100 includes a processor 105, a memory 110, an IO module 115, a graphics module 120, a display module 125, a basic input/output system (BIOS) module 130, a network module 135, a universal serial bus (USB) module 140, an audio module 145, a peripheral component interconnect express (PCIe) module 150, and a storage module 155. One of skill in the art will recognize that other configurations of a computing device 100 or multiple computer systems 100 may be employed with the embodiments described herein.

The processor 105, memory 110, IO module 115, graphics module 120, display module 125, BIOS module 130, network module 135, USB module 140, audio module 145, PCIe module 150, and storage module 155, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 155. The storage module 155 may comprise at least one Solid State Device (SSD). In addition, the storage module 155 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110 and the graphic module 120.

In addition, the processor 105 may communicate with the IO module 115. The IO module 125 may support and communicate with the BIOS module 130, the network module 135, the PCIe module 150, and the storage module 155.

The PCIe module 150 may communicate with the IO module 115 for transferring data or power to peripheral devices. The PCIe module 150 may include a PCIe bus for attaching the peripheral devices. The PCIe bus can logically connect several peripheral devices over the same set of connections. The peripherals may be selected from a printer, a joystick, a scanner, or the like. The PCI module 150 may also comprise an expansion card as is well known to those skilled in the art.

The BIOS module 130 may communicate instructions through the IO module 115 to boot the computing device 100, so that computer readable software instructions stored on the storage module 155 can load, execute, and assume control of the computing device 100. Alternatively, the BIOS module 130 may comprise a coded program embedded on a chipset that recognizes and controls various devices that make up the computing device 100.

The network module 135 may communicate with the IO module 115 to allow the computing device 100 to communicate with other devices over a network. The devices may include routers, bridges, computers, printers, and the like.

The display module 125 may communicate with the graphic module 120 to display information as will be described hereafter. The display module 125 may be a cathode ray tube (CRT), a liquid crystal display (LCD) monitor, or the like.

The USB module 140 may communicate with one or more USB compatible devices over a USB bus. The audio module 145 may generate an audio output.

In one embodiment, each module comprises a computer readable storage medium comprising a computer readable program stored on a tangible storage device.

Figure 2A:
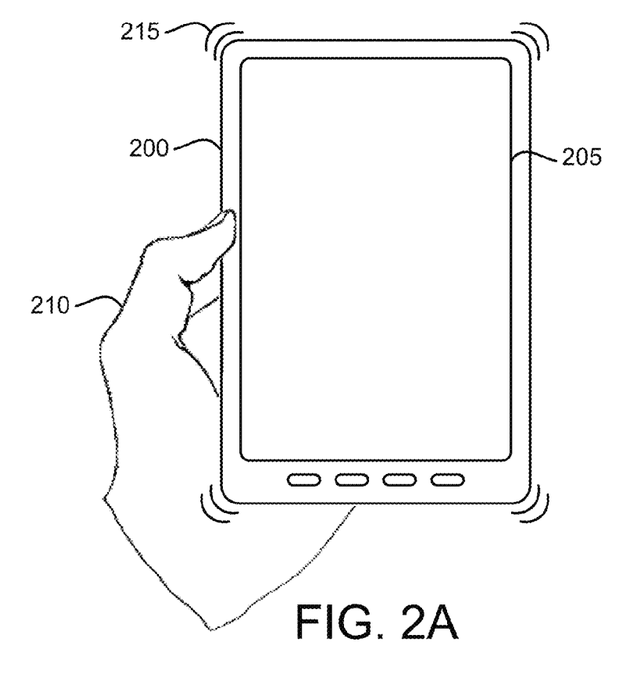
FIG. 2A is a schematic block diagram illustrating one embodiment of an electronic device.

FIG. 2A is a schematic block diagram illustrating one embodiment of an electronic device 200. The electronic device 200 may comprise a portable computing device and/or an information handling device such as a touch device, a personal desktop assistant ("PDA"), a tablet computer, an eBook reader, a mobile phone, a Smartphone, and the like. The electronic device 200 may be one embodiment of the computing device 100 depicted in FIG. 1. The depicted electronic device 200 includes a display 205. Furthermore, the electronic device 200 may be configured to be held in a user's hand 210 during use. As a result, the electronic device 200 may be subject to slight movements 215 while in the user's hand 210. For example, assuming the electronic device is an eBook reader 200, a user may read a page on an eBook reader 200 while holding the eBook reader 200. Although the user attempts to hold the eBook reader 200 steady, the eBook reader 200 may be subject to slight movements 215 resulting from the natural motion of the user's hand 210.

Figure 2B:
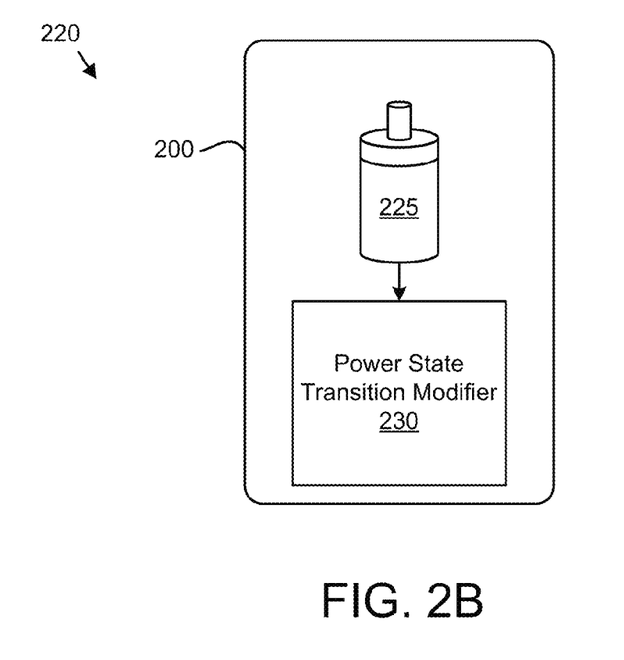
FIG. 2B is a schematic block diagram illustrating one embodiment of a system for modifying a transition to an altered power state of an electronic device based on accelerometer output.

FIG. 2B is a schematic block diagram illustrating one embodiment of a system 220 for modifying a transition to an altered power state of an electronic device 200 based on accelerometer output. The system 220 includes the electronic device 200 with an accelerometer 225 and a power state transition modifier 230.

Figure 3A:
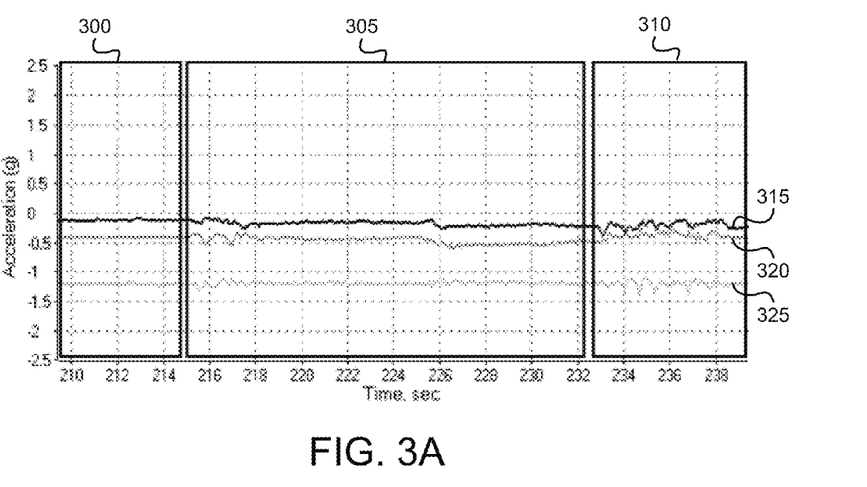
FIG. 3A is one embodiment of sample accelerometer output.
Figure 3B:
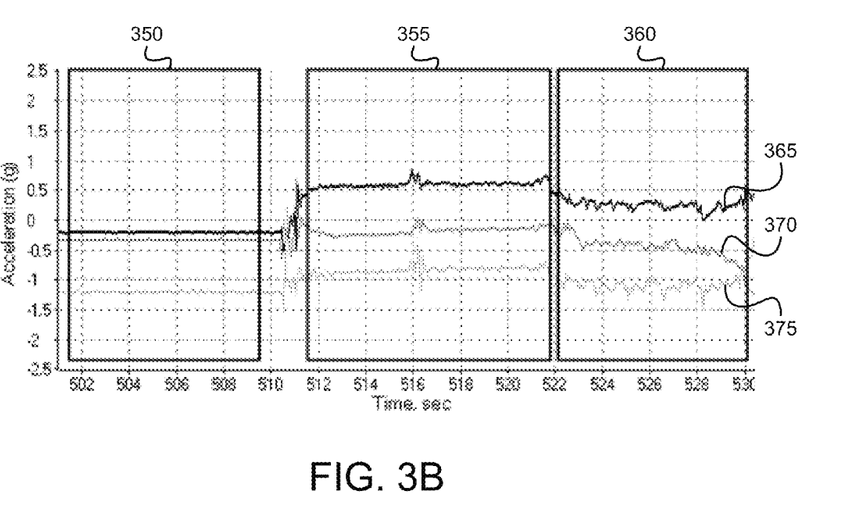
FIG. 3B is another embodiment of sample accelerometer output.

The accelerometer 225 measures physical acceleration (magnitude and direction), position, and/or shock of the electronic device 200. The accelerometer 225 may output an acceleration signature including acceleration measurements, accelerometer values at a point in time and/or over a time period, changes in accelerometer values, and the like. In one embodiment, the accelerometer output includes graphical information, or may be converted into graphical information such as the graphical information depicted in FIGS. 3A and 3B, which depict embodiments of example accelerometer output. FIGS. 3A and 3B show gravitational acceleration (g) over time (in seconds) for an x-axis 320,370, a y-axis 315, 365, and a z-axis 325,375. One of ordinary skill in the art realizes that accelerometer output may exist in various forms.

Referring back to FIG. 2B, a program or application on the electronic device 200 may access the accelerometer output through an application programming interface ("API") or other interface. In another embodiment, the accelerometer output is accessed directly in hardware. In one embodiment, an entity such as an operating system, an application, a program, and/or a utility running on the electronic device 200, uses accelerometer output during operation. For example, a Smartphone operating system may use accelerometer output to detect when the user tilts or turns the Smartphone 200, and in response, the operating system may rotate the picture on the display 205 such that the picture appears oriented correctly to the user.

A user may read books, documents, or articles and view videos on certain electronic devices 200 such as eBook readers, Smartphones, tablet computers, and the like. Therefore, an electronic device 200 may still be in use, even though it may not frequently receive user input. Furthermore, an electronic device 200 may be configured to dim or turn off its display 205 or to enter a standby state if the electronic device 200 has not received user input for a certain period of time, the electronic device 200 assuming that it is not being used due to lack of user input. As a result, the electronic device 200 may dim/turn off its display, power off, or enter a standby state, producing an undesired result that interrupts the user's experience.

The power state transition modifier 230 determines, using accelerometer output, that the user may still be using the electronic device 200 and modifies the timing of the transition of the electronic device 200 into an altered power state. An altered power state includes a state in which the electronic device 200 performs operations related to power savings and/or operates with certain operations suspended or at a reduced capacity. The altered power state may include but is not limited to a standby state, a quiesced state, a low-power state, a hibernate state, the electronic device 200 operating with a dimmed or inactive display, the electronic device 200 powered off, and the electronic device 200 operating a screensaver. In one embodiment, an altered power state includes a high-power state and/or a state in which one or more operations of the electronic device are operating at a high capacity.

A transition into an altered power stated is an action of the electronic device 200 entering into the altered power state and/or the signal, cue, or initiator causing the electronic device 200 to enter the altered power state. For example, a transition into an altered power state by an electronic device 200 may include, but is not limited to the electronic device 200 suspending certain operations, beginning operation at a reduced capacity, dimming or shutting down a display 205, powering off, initiating a screensaver, and entering a low power state such as a standby state, a quiesced state, hibernate state. In one embodiment, a transition to an altered power state includes the electronic device 200 transitioning to a higher power state with increased functionality and/or capacity.

Furthermore, a transition to an altered power state may be controlled and/or initiated by one or more altered power state timers of the electronic device 200. These altered power state timers may be part of the operating system of the electronic device 200, an application or utility running on the electronic device 200, and the like. An altered power state timer may track a length of time without a user input and if the length of time exceeds a predetermined threshold, the altered power state timer may signal the electronic device 200 to transition to an altered power state. For example, an operating system of an electronic device 200 may dim the display of the electronic device 200 in response to a signal from an altered power state timer detecting that a user has not entered input for a predetermined time period.

Using the accelerometer output, the power state transition modifier 230 may determine that the electronic device 200 is in use even if it is not receiving and/or has not received user input for a predetermined time period. Specifically, when a user is holding an electronic device 200, the accelerometer output may indicate slight variations in accelerometer values due to small motions by the user's hands or body. Furthermore, this accelerometer output may be distinct from accelerometer output associated with the electronic device 200 lying on a desk, or inside a user's bag or pocket while the user is walking.

FIGS. 3A and 3B show accelerometer output for a first time period 300,350 in which an electronic device 200 is lying stationary on a desk. As depicted, the accelerometer output shows little to no variation in accelerometer values for the first time period 300,350.

FIGS. 3A and 3B also show accelerometer output for a second time period 305,355 in which the electronic device 200 is "in-use" by a user, meaning that the electronic device 200 is held in the user's hand while the user reads a document or views video from the display 200 of the electronic device 200. As depicted in FIGS. 3A and 3B, the accelerometer output shows slight variations in accelerometer values during the second time period 305,355. The accelerometer activity in the second time period 305,355 is greater than accelerometer activity in the first time period 300,350.

FIGS. 3A and 3B also show accelerometer output for a third time period 310,360 in which the user holds the electronic device 200 while walking. As depicted in FIGS. 3A and 3B, the accelerometer output shows significant variations in accelerometer values during the third time period 310,360.

In addition, FIG. 3B shows that large accelerometer value changes may occur when transitioning between each state. FIG. 3B shows large accelerometer value spikes between the first time period 300,350 and the second time period 305,355, when the user picks up the electronic device 200 from the desk and begins holding the electronic device 200 for use.

Referring now to FIG. 2B in addition to FIGS. 3A and 3B, the power state transition modifier 230 may determine an in-use condition based on accelerometer output. An in-use condition is a condition, state, and/or status of an electronic device 200 determined from accelerometer output indicative of a user using the electronic device 200. The in-use condition indicates that a user may be using the device and/or that a transition to an altered power state is not desirable at a particular moment in time. The power state transition modifier 230 may determine the in-use condition from accelerometer output including an accelerometer signature indicative of the user using the electronic device 200, such as the accelerometer values in the accelerometer output for the second time period 305,355 in FIGS. 3A and 3B.

The power state transition modifier 230 may also modify behavior of the electronic device 200 to delay or deactivate the transition to an altered power state in response to determining an in-use condition. Thus, a user who is performing an activity on the portable electronic not requiring frequent user input, such as reading text or watching video, is sparred the interruption of a screen saver, standby mode entry, or power-off.

The power state transition modifier 230 may be embodied as software, hardware, or a combination of hardware and software. In one embodiment, the power state transition modifier 230 includes software code residing on a storage module 155 of the electronic device 200. The power state transition modifier 230 may be an application or utility that interfaces with the operating system of the electronic device 200. Furthermore, the power state transition modifier 230 reads, receives, references, and/or obtains accelerometer output from the accelerometer 225. The power state transition modifier 230 may communicate with the accelerometer 225, and/or is coupled to the accelerometer 225. In one embodiment, the power state transition modifier 230 references accelerometer output through a software API. In another embodiment, the power state transition modifier 230 is connected to the accelerometer 225 in hardware.

Figure 4:
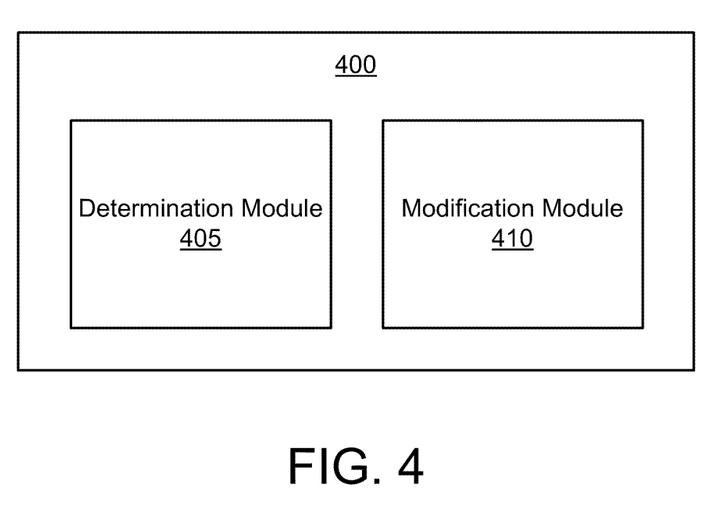
FIG. 4 is a schematic block diagram illustrating one embodiment of an apparatus for modifying a transition to an altered power state of an electronic device based on accelerometer output.

FIG. 4 is a schematic block diagram illustrating one embodiment of an apparatus 400 for modifying a transition to an altered power state of an electronic device 200 based on accelerometer output. The apparatus 400 may be the power state transition modifier 230 depicted in FIG. 2B. The description of the apparatus 400 refers to elements of FIGS. 1-3B, like numbers referring to like elements. The apparatus 400 includes a determination module 405 and a modification module 410.

The determination module 405 determines an in-use condition of an electronic device 200 based on accelerometer output for the electronic device 200. The electronic device 200 may be a electronic device 200, such as the electronic device 200 depicted in FIGS. 2A and 2B and may include a portable computing device and/or an information handling device such as a touch device, a personal desktop assistant ("PDA"), a tablet computer, an eBook reader, a mobile phone, a Smartphone, and the like. The electronic device 200 may also be a peripheral device, or device that is dependent on and/or operating under control of another computing device. Examples of a peripheral device include, but are not limited to a mouse, a webcam, a microphone, a storage drive, and the like. Furthermore, the electronic device 200 may include an accelerometer 225 providing accelerometer output measuring acceleration of the electronic device 200.

As stated above, the accelerometer output may comprise an acceleration signature including acceleration measurements, accelerometer values at a point in time and/or over a time period, acceleration changes, and the like. In one embodiment, the determination module 405 monitors changes and/or patterns in accelerometer values of the accelerometer output over a period of time and determines the in-use condition based on changes and/or patterns in the accelerometer values over the period of time. For example, the determination module 405 may determine that changes in accelerometer values for one or more dimensions (e.g., on the X, Y, or Z axes) lie within a predetermined range for a predetermined amount of time, and/or match or approximate a predetermined accelerometer output signature, indicating an in-use condition. For example, the determination module 405 may determine an in-use condition when accelerometer values have variations of between 0.05 and 0.1 g for at least three seconds. In another example, the determination module 405 may determine an in-use condition when accelerometer values have a predetermined number of variations in a predetermined range for a predetermined amount of time.

The determination module 405 may reference in-use condition specifications in one or more in-use definitions. In one embodiment, the determination module 405 determines the in-use condition in response to determining that the changes and/or patterns in the accelerometer values correspond with an in-use definition. An in-use definition is a predefined accelerometer output signature that may be indicative of a user using the electronic device 200 and may include, but not be limited to, an accelerometer value range, accelerometer value pattern, accelerometer value change and time specification, and accelerometer output wave pattern. In one embodiment, the determination module 405 stores and/or has access to a plurality of in-use definitions with varying in-use specifications and signatures. The determination module 405 may determine an in-use condition if the accelerometer output meets one or more of the plurality of in-use definitions. In one embodiment, the determination module 405 classifies in-use definitions. For example, an in-use definition may be classified by a type of use, such as "handheld use," "handheld while walking use," and the like. The user, in one embodiment, may save, edit, classify, and delete in-use definitions.

In one embodiment, a user may adjust the sensitivity of the determination module 405. For example, the user may adjust the determination module 405 to narrow the in-use definition or decrease the number of in-use definition possibilities. As a result, the determination module 405 may require accelerometer output that more closely approximates a certain accelerometer output signature. In another example, the user may broaden the in-use definition resulting in a wider range of accelerometer output qualifying as an in-use condition.

The determination module 405 may continually monitor the accelerometer output while the electronic device 200 is powered on. In another embodiment, the determination module 405 begins monitoring the accelerometer output in response to one or more altered power state timers elapsing or approaching a predetermined time period without user input when the altered power state timer would signal for a transition to an altered power state.

The modification module 410 modifies a transition to an altered power state of the electronic device 200 in response to the determination module 405 determining the in-use condition. In one embodiment, the determination module 405 signals the modification module 410 to modify the transition. In certain embodiments, the determination module 405 signals the modification module 410 to modify the transition and specifies a modification action. The modification action is the action the modification module 410 takes to modify the transition to an altered power state. In one embodiment, a modification action includes extending time of one or more altered power state timers, the timers associated with the transition to the altered power state of the electronic device 200, in response to the determination module 405 determining the in-use condition. In another embodiment, the modification action includes turning off the altered power state timers. In certain embodiments, the modification module 410 performs a modification action in response to both the determination module 405 determining the in-use condition and the electronic device 200 attempting to perform an altered state transition.

In certain embodiments, the modification action depends on the classification of the in-use definition from the determination module 405. For example, if the determined in-use state is "handheld use," the modification module 410 may deactivate the altered power state timers while if the determined in-use state is "handheld while walking use," the modification module 410 may extend the altered power state timers.

Figure 5:
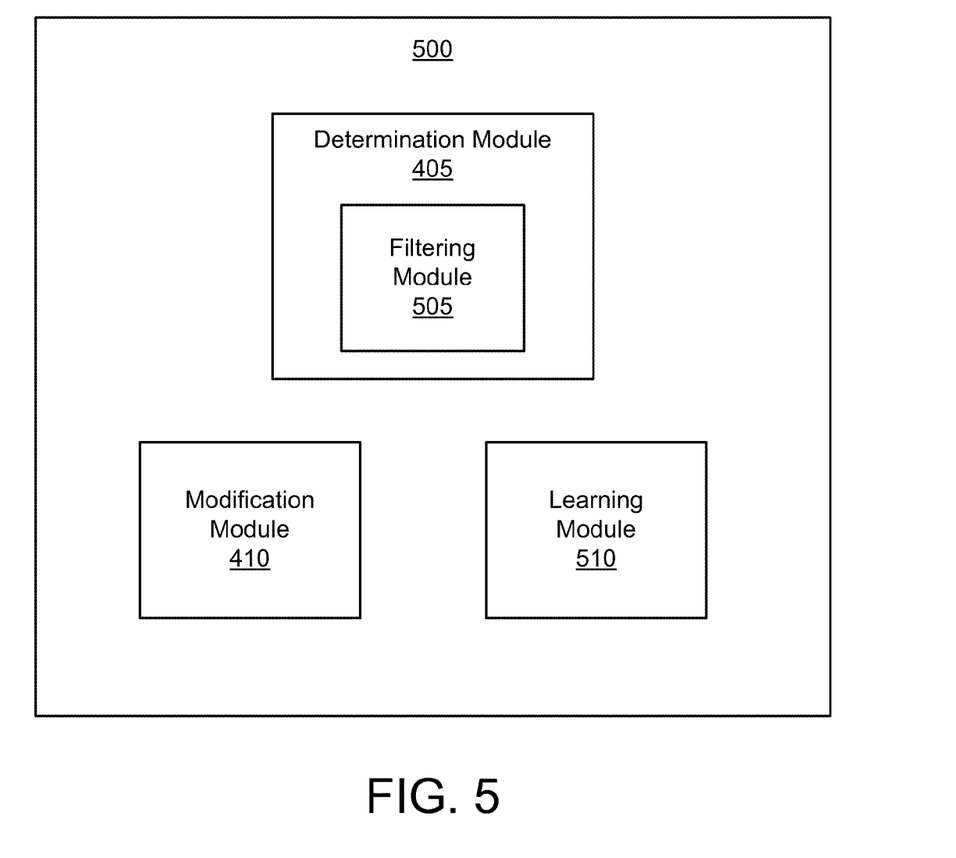
FIG. 5 is a detailed schematic block diagram illustrating another embodiment of an apparatus for modifying a transition to an altered power state of an electronic device based on accelerometer output.

FIG. 5 is a detailed schematic block diagram illustrating another embodiment of an apparatus 500 for modifying a transition to an altered power state of an electronic device 200 based on accelerometer output. The apparatus 500 may be the power state transition modifier 230 depicted in FIG. 2B. The description of the apparatus 500 refers to elements of FIGS. 1-3B, like numbers referring to like elements. The apparatus 500 includes the determination module 405 and the modification module 410, wherein these include substantially the same features as described in relation to FIG. 4. In addition, the determination module 405 includes a filtering module 505 and the apparatus 500 further includes a learning module 510.

The filtering module 505 filters particular changes in the one or more accelerometer values out of the accelerometer output. The particular changes may be characteristic of a type of movement of the electronic device 200. The determination module 405 may then determine the in-use condition from the filtered accelerometer output. In one embodiment, a type of movement may include a walking movement and the filtering module 505 may filter out changes in accelerometer values caused by the walking movement. The determination module 405 may then determine whether the filtered accelerometer output matches an in-use definition. For example, a user may be walking and viewing a video on an electronic device 200.

The accelerometer output would include accelerometer values reflective of both kinds of movement and the filtering module 505 may isolate one or more types of movement. A type of movement may also be movement caused by riding in an automobile or train. The filtering module 505 may filter out the changes in the accelerometer output caused by riding in the automobile or train so that the determination module 405 may determine whether the filtered accelerometer output fulfills an in-use definition.

The learning module 510 adapts existing in-use definitions or creates new in-use definitions to allow for more accurate recognition of when a user is actually using the electronic device 200. Furthermore, the learning module 510 may also allow a user to customize in-use definitions. The learning module 510 may monitor user interaction with the electronic device 200 and associate user interaction with a portion of accelerometer output including a particular accelerometer output signature. For example, if the learning module 510 detects user interaction with the electronic device 200, the learning module 510 may associate the user interaction with an accelerometer output signature during the time period of the user interaction. The learning module 510 may adapt an in-use definition or create a new in-use definition based on this association. For example, if a user interacts with the electronic device 200, and the accelerometer output includes a particular accelerometer signature, a similar accelerometer signature in the future may also indicate that the user is using the electronic device 200. Therefore, the learning module 510 may include the accelerometer signature associated with the time period during the user interaction with in an in-use definition.

User interaction may include user input such as a mouse click, keystroke, touch screen reading, and the like. In one embodiment, the learning module 510 may further record the monitored user interaction including information about the user interaction such as the type of user interaction and whether the user interaction occurred in response to an altered state transition. For example, if a user must continually perform user input to deactivate a screen saver, the learning module 510 may record the fact that the user input was immediately after the electronic device 200 activated the screen saver (a transition to an altered power state). If the number of recorded user inputs after a screen saver activates reaches a threshold and the accelerometer output signatures proximate to the user inputs are similar, the learning module 510 may include the accelerometer output signature associated with the user inputs in an in-use definition.

In one embodiment, the learning module 510 may allow a user to associate an accelerometer output signature with an in-use condition. In one embodiment, a user may "record" an accelerometer output signature to be used as an in-use definition. For example, a user may signal the learning module 510 to begin recording, the user may handle the electronic device 200 in a manner that the user wants the electronic device 200 to consider as in-use, and the user may signal the learning module 510 when this learning period is over. Therefore, a user may customize the in-use definitions according to the user's typical movements while using the electronic device 200.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6A:
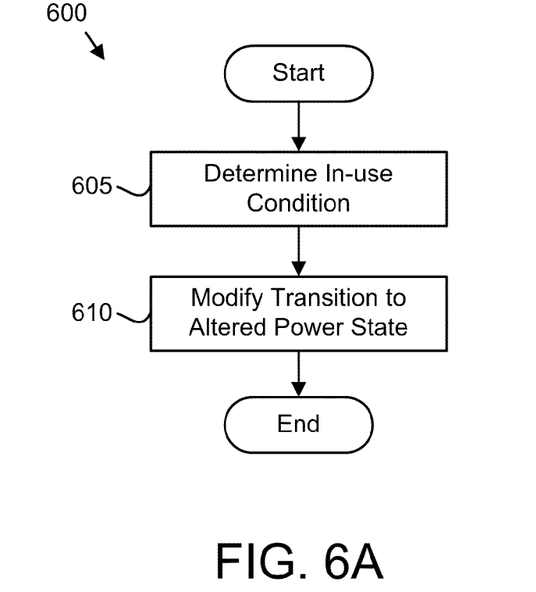
FIG. 6A is a schematic flow chart diagram illustrating one embodiment of a method for modifying a transition to an altered power state of an electronic device based on accelerometer output.

FIG. 6A is a schematic flow chart diagram illustrating one embodiment of a method 600 for modifying a transition to an altered power state of an electronic device 200 based on accelerometer output. The method 600 substantially includes the steps to carry out the functions presented above with respect to the operation of the described apparatus and system of FIGS. 1, 2, 4, and 5. The description of the method 600 refers to elements of FIGS. 1-5, like numbers referring to like elements.

In one embodiment, the method 600 is implemented with a computer readable storage medium comprising a computer readable program stored on a tangible memory device. The computer readable storage medium may be integrated into a computer system, such as the computing device 100, wherein the computer readable program executed by the processor 105 performs the method 600.

The method 600 starts and the determination module 405 determines 605 an in-use condition of an electronic device 200 based on accelerometer output for the electronic device 200. The electronic device 200 may be a portable information handling device, a mobile phone, and the like. Furthermore, the determination module 405 may reference, obtain, or receive the accelerometer output from an accelerometer in the electronic device 200. Next, the modification module 410 modifies 610 a transition to an altered power state of the electronic device 200 in response to the determination module 405 determining the in-use condition. The transition to the altered power state may include, but is not limited to the electronic device 200 suspending certain operations, beginning operation at a reduced capacity, dimming or shutting down a display 205, powering off, initiating a screensaver, and entering a low power state such as a standby state, a quiesced state, or hibernate state. Then, the method 600 ends.

Figure 6B:
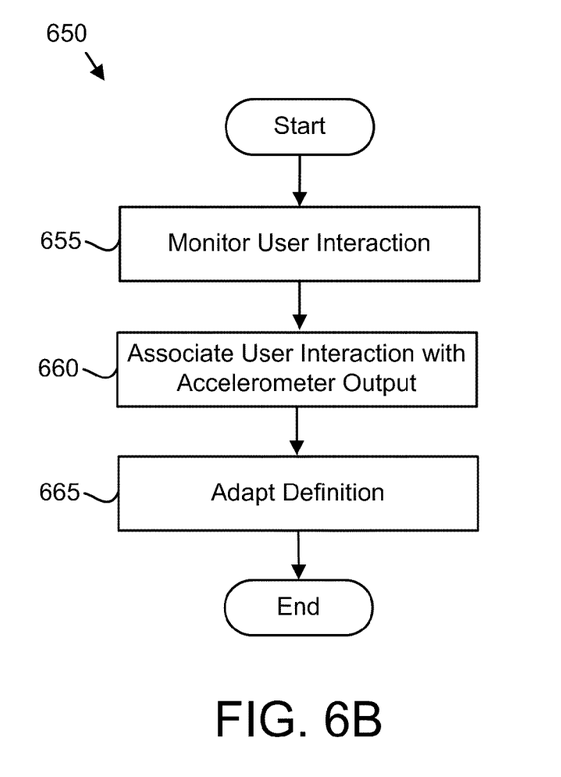
FIG. 6B is a schematic flow chart diagram illustrating another embodiment of a method for modifying a transition to an altered power state of an electronic device based on accelerometer output.

FIG. 6B is a schematic flow chart diagram illustrating another embodiment of a method 650 for modifying a transition to an altered power state of an electronic device 200 based on accelerometer output. The method 650 substantially includes steps to carry out particular functions presented above with respect to the operation of the described apparatus and system of FIGS. 1, 2, 4, and 5. The description of the method 650 refers to elements of FIGS. 1-5, like numbers referring to like elements.

In one embodiment, the method 650 is implemented with a computer readable storage medium comprising a computer readable program stored on a tangible memory device. The computer readable storage medium may be integrated into a computer system, such as the computing device 100, wherein the computer readable program executed by the processor 105 performs the method 650.

The method 650 starts and the learning module 510 monitors 655 user interaction with an electronic device 200. Next, the learning module 510 associates 660 the monitored user interaction with a portion of accelerometer output from an accelerometer of the electronic device. The portion of the accelerometer output may include accelerometer output received at a time period proximate to the user interaction. The learning module 510 then adapts 665 an in-use definition based on the association of the monitored user interaction with the portion of the accelerometer output. The learning module 510 may also create a new in-use definition based on the portion of the accelerometer output. Thus, the learning module 510 may customize in-use definitions based on accelerometer output signatures associated with times in which the user is more likely to be using the electronic device 200. Then, the method 650 ends.

Figure 7:
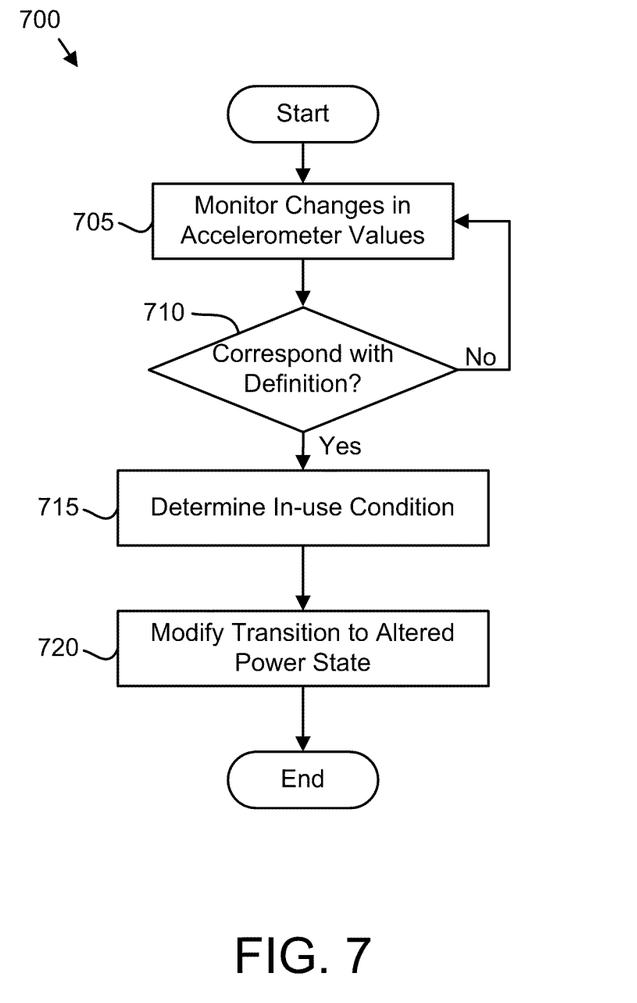
FIG. 7 is a detailed schematic flow chart diagram illustrating yet another embodiment of a method for modifying a transition to an altered power state of an electronic device based on accelerometer output.

FIG. 7 is a detailed schematic flow chart diagram illustrating yet another embodiment of a method 700 for modifying a transition to an altered power state of an electronic device 200 based on accelerometer output. The method 700 substantially includes the steps to carry out the functions presented above with respect to the operation of the described apparatus and system of FIGS. 1, 2, 4 and 5. The description of the method 700 refers to elements of FIGS. 1-5, like numbers referring to like elements.

In one embodiment, the method 700 is implemented with a computer readable storage medium comprising a computer readable program stored on a tangible memory device. The computer readable storage medium may be integrated into a computer system, such as the computing device 100, wherein the computer readable program executed by the processor 105 performs the method 700.

The method 700 starts and the determination module 405 monitors 705 changes in accelerometer values, or accelerometer output signature, of accelerometer output over a period of time. The determination module 405 then determines 710 a condition of whether the changes in the one or more accelerometer values correspond with an in-use definition. Specifically, the determination module 405 may determine 710 that the changes do not correspond with an in-use definition and the determination module 405 continues to monitor 705 changes in accelerometer values. Alternatively, the determination module 405 determines 710 that the changes correspond with an in-use definition. Next, the determination module 405 determines 715 an in-use condition of the electronic device 200. The modification module 410 then modifies 720 a transition to an altered power state of the electronic device 200 in response to the determination module 405 determining the in-use condition. The modification module 410 may extend the altered power state timers to delay entry into the altered power state. The modification module 410 may also deactivate the timers. In addition, the modification module 410 may extend the altered power state times in response to the electronic device 200 attempting to enter an altered power state. Then, the method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an electronic device having a display and an accelerometer, wherein the accelerometer output for the electronic device comprises a plurality of variations in accelerometer values, the plurality of variations based on movement initiated external to the electronic device, the plurality of variations comprising slight variations below a threshold value and other variations above the threshold value;
   a determination module determining an in-use condition of the electronic device comprising a filtering module filtering the other variations above the threshold value out of the accelerometer output, the slight variations below a threshold value indicating an in-use condition of the electronic device,     wherein the determination module monitors the filtered accelerometer output for the in-use condition in response to a predetermined time period passing on one or more power state timers associated with a transition to an altered power state of the electronic device;

a modification module modifying the transition to the altered power state of the electronic device in response to the determination module determining the in-use condition, wherein modifying the transition to the altered power state of the electronic device comprises deactivating the one or more power state timers associated with the transition to the altered power state of the electronic device; and a learning module     monitoring user interaction with the electronic device, wherein the user interaction is selected from the group consisting of mouse input, keyboard input, and touch input,     associating the monitored user interaction with a portion of the accelerometer output, and     adapting an in-use definition based on the association of the monitored user interaction with the portion of the accelerometer output.

2. The apparatus of claim 1, wherein the determination module monitors changes in one or more of the slight variations of the accelerometer values of the accelerometer output over a period of time, wherein the determination module determines the in-use condition based on the changes in the one or more slight variations of the accelerometer values over the period of time.

3. The apparatus of claim 2, wherein the determination module determines the in-use condition in response to determining that the changes in the one or more slight variations of the accelerometer values correspond with an in-use definition, the in-use definition indicative of a user using the electronic device.

4. The apparatus of claim 1, wherein the altered power state of the electronic device comprises one or more of a quiesced state, a low-power state, a high-power state, a state in which one or more operations of the electronic device are operating at a high capacity, and a state in which one or more operations of the electronic device are one of suspended and operating at a reduced capacity.

5. The apparatus of claim 1, wherein the electronic device comprises one of a portable information handling device, mobile phone, and a peripheral device.

6. A method comprising:

determining an in-use condition of an electronic device based on accelerometer output for the electronic device, the accelerometer output comprising a plurality of variations in accelerometer values below a threshold, the plurality of variations based on movement initiated external to the electronic device, the accelerometer output indicative of use by a user, wherein determining the in-use condition comprises:

filtering accelerometer values above a threshold value out of the accelerometer output, the accelerometer values below the threshold value characteristic of a type of movement of the electronic device; and         monitoring the filtered accelerometer output for the in-use condition in response to a predetermined time period passing on one or more power state timers associated with a transition to an altered power state of the electronic device;

modifying the transition to an altered power state of the electronic device in response to determining the in-use condition, wherein modifying the transition to the altered power state of the electronic device comprises deactivating the one or more power state timers associated with the transition to the altered power state of the electronic device;

monitoring user interaction with the electronic device, wherein the user interaction is selected from the group consisting of mouse input, keyboard input, and touch input, associating the monitored user interaction with the accelerometer values below the threshold value; and adapting an in-use definition based on the association of the monitored user interaction with the accelerometer values below the threshold value.

7. The method of claim 6, wherein determining the in-use condition further comprises monitoring changes in one or more accelerometer values of the accelerometer output over a period of time and determining the in-use condition based on the changes in the one or more accelerometer values over the period of time.

8. The method of claim 7, wherein the in-use condition is determined in response to determining that the changes in the one or more accelerometer values correspond with an in-use definition, the in-use definition indicative of a user using the electronic device.

9. The method of claim 7, wherein determining the in-use condition further comprises filtering the one or more accelerometer values above the threshold value out of the accelerometer output and determining the in-use condition based on accelerometer values below the threshold value, the accelerometer values below the threshold value characteristic of a type of movement of the electronic device.

10. The method of claim 6, wherein the altered power state of the electronic device comprises one or more of a quiesced state, a low-power state, a high-power state, a state in which one or more operations of the electronic device are operating at a high capacity, and a state in which one or more operations of the electronic device are one of suspended and operating at a reduced capacity.

11. The method of claim 6, wherein the electronic device comprises one of a portable information handling device, a mobile phone, and a peripheral device.

12. A computer program product comprising a non-transitory computer readable storage medium storing computer usable program code executable to perform operations comprising:

determining an in-use condition of an electronic device based on accelerometer output for the electronic device, the accelerometer output comprising a plurality of variations in accelerometer values below a threshold, the plurality of variations based on movement initiated external to the electronic device, the accelerometer output indicative of use by a user, wherein determining the in-use condition comprises:

filtering accelerometer values above a threshold value out of the accelerometer output, the accelerometer values below the threshold value characteristic of a type of movement of the electronic device; and         monitoring the filtered accelerometer output for the in-use condition in response to a predetermined time period passing on one or more power state timers associated with a transition to an altered power state of the electronic device;

modifying the transition to an altered power state of the electronic device in response to determining the in-use condition, wherein modifying the transition to the altered power state of the electronic device comprises deactivating the one or more power state timers associated with the transition to the altered power state of the electronic device;

monitoring user interaction with the electronic device, wherein the user interaction is selected from the group consisting of mouse input, keyboard input, and touch input, associating the monitored user interaction with the accelerometer values below the threshold value; and adapting an in-use definition based on the association of the monitored user interaction with the accelerometer values below the threshold value.

13. The computer program product of claim 12, wherein determining the in-use condition further comprises monitoring patterns in the accelerometer values below the threshold value of the accelerometer output over a period of time and determining the in-use condition based on the monitored patterns.

14. The computer program product of claim 13, wherein the in-use condition is determined in response to determining that the patterns in the one or more accelerometer values correspond with an in-use definition, the in-use definition indicative of a user using the electronic device.

15. The computer program product of claim 12, wherein the altered power state of the electronic device comprises one or more of a quiesced state, a low-power state, a high-power state, a state in which one or more operations of the electronic device are operating at a high capacity, and a state in which one or more operations of the electronic device are one of suspended and operating at a reduced capacity.

* * * * *